United States Patent [19]

An

[11] Patent Number: 5,703,453
[45] Date of Patent: Dec. 30, 1997

[54] HORIZONTAL STATE CORRECTION CIRCUIT OF A DISK TRANSFERRING DEVICE AND METHOD THEREFOR

[75] Inventor: Jong Tae An, Kyungki-do, Rep. of Korea

[73] Assignee: Samsung Electronics Co., Ltd., Kyungki-do, Rep. of Korea

[21] Appl. No.: 439,475

[22] Filed: May 11, 1995

[30] Foreign Application Priority Data

May 12, 1994 [KR] Rep. of Korea ............ 94-10349

[51] Int. Cl.$^6$ .......................................... G11B 5/48
[52] U.S. Cl. ........................ 318/625; 318/648; 369/38
[58] Field of Search .................... 318/568.1, 568.11, 318/568.21, 568.2, 568.22, 638, 652, 640, 625, 685, 696, 648, 649; 414/277–280; 369/30, 33, 34, 36, 38; 356/375

[56] References Cited

U.S. PATENT DOCUMENTS

| | | | |
|---|---|---|---|
| 4,827,463 | 5/1989 | Motoyoshi et al. | 369/36 |
| 4,968,924 | 11/1990 | Mori et al. | 318/568.1 |
| 5,126,648 | 6/1992 | Jacobs | 318/640 |
| 5,164,928 | 11/1992 | Oliver et al. | 369/34 |
| 5,303,034 | 4/1994 | Carmichael et al. | 356/375 |
| 5,392,266 | 2/1995 | Kobayashi et al. | 369/36 |
| 5,427,489 | 6/1995 | Chalmers et al. | 414/277 |
| 5,428,587 | 6/1995 | Wanger et al. | 369/30 |

*Primary Examiner*—Brian Sircus
*Attorney, Agent, or Firm*—Sughrue, Mion, Zinn, Macpeak & Seas, PLLC

[57] ABSTRACT

The present invention provides a circuit for correcting a horizontal state of a disk transferring device including chucks for clamping a selected disk from a cartridge, a chuck transferring body for transferring the chucks right or left, a lower frame combined with the chucks and the chuck transferring body to move them left or right, and first and second frames formed integrally with the chucks, the chuck transferring body and lower frame and fixedly connected to belts to move the chucks, chucks transferring body and lower frame up and down by the belts. The circuit comprises a detecting circuit determining a right height and a left height of the disk transferring device to detect an error in a horizontal state; a comparator for comparing an amount of error in the left and right horizontal state detected by the detecting circuit; a controlling circuit determining a rotation direction of correction motors according to the error in the horizontal state detected by the detecting circuit; and a correcting circuit for driving the correction motors as much as the amount of error compared by the comparator to correct the horizontal state of the disk transferring device.

24 Claims, 8 Drawing Sheets

FIG.9A
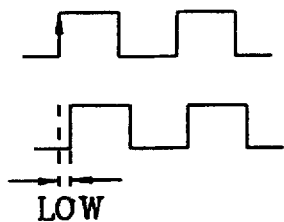
LOW
FIG.9B
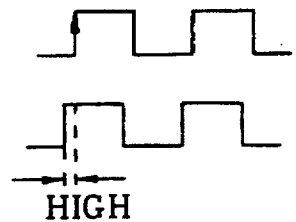
HIGH

HORIZONTAL STATE CORRECTION CIRCUIT OF A DISK TRANSFERRING DEVICE AND METHOD THEREFOR

BACKGROUND OF THE INVENTION

1. Field of the Invention

The present invention relates to a horizontal state correction circuit of a disk transferring device and a method for correcting a horizontal state of the disk transferring device. More particularly, in an auto-changer type disk player which automatically selects a plurality of disks and reproduces them, a disk transferring device selects one out of the plurality of disks for transferring to a reproducing means, and a correction circuit determines a horizontal balance state of the disk transferring device for automatically correcting errors of the horizontal state to exactly load and/or unload a desired disk.

2. Detailed Description of the Prior Art

The following describes a conventional auto-changer type disk player as shown in FIGS. 1 and 2.

FIG. 1 is a schematic perspective view of a conventional auto-changer type disk player. A chassis 1 includes a left cartridge 3 having a plurality of disks 2, a plurality of resters 4 in the cartridge 3 to secure a disk stored in the cartridge 3, and a plurality of reproducing devices 5, 6 under the cartridge 3. Symmetrically thereto, a disk 7, a right cartridge 8, resters 9 and reproducing devices 10, 11 are provided.

The chassis also includes chucks 12 that are formed in front of the cartridges 3 and 8 for selecting one of the plurality of disks 2 stored in the left cartridge 3 or one of the plurality of disks 7 stored in the right cartridge 8, and a chuck transferring body 13 for transferring the chucks 12 horizontally to the front of the right cartridge 8 or to the front of the left cartridge 3.

A motor (not shown) is installed on the upper portion of the chuck transferring body 13 and adjusts the space between the chuck 12 for exact mounting of the disks 2 and 7 to the chucks 12. Accordingly, the space between the right and left chucks 12 is adjusted on the chuck transferring body 13 by this motor.

A lower frame 14 for supporting the horizontal right-and-left movement of the chuck transferring body 13 is formed in parallel with the lo chuck transferring body 13 thereunder. And, a motor (not shown) is installed under the chuck transferring body 13 to move the chuck transferring body 13 to the front of the right and left cartridges 3 and 8.

Left and right frames 15, 16 are integrally formed perpendicular to the lower frame 14 for supporting the chucks 12, chuck transferring body 13 and lower frame 14 while providing for up-and-down movement thereof, perpendicular to the movement of the chuck transferring body 13.

A disk transferring device includes the above mentioned chucks 12, chuck transferring body 13, lower frame 14 and left and right frames 15, 16.

A pair of belts 17, 18 respectively fixed and combined to the left and right sides of the left frame 15 to move the disk transferring device up and down. Two pairs of brackets 19, 20 and 21, 22 are disposed respectively to the belts 17, 18 and are fixed to the left side of the chassis 1 to support the belts 17, 18.

Symmetrically, a pair of belts 23, 24 are formed respectively on the right and left sides of the right frame 16 in the same way as with the belts 17, 18. Also, in the same way as with the brackets 19–22 connected to the left frame 15, two pairs of brackets (not shown) are disposed respectively to the belts 23, 24 and fixed to the right side of the chassis 1 to support the belts 23, 24 when these belts 23, 24 move.

A motor 25 fixed to belts 17, 18 is fixedly disposed to the left side of the chassis 1 to operate the belts 17, 18 so as to move, and a motor (not shown) is fixedly disposed to the right side of the chassis 1 to operate in the same manner as the motor 25.

In such an auto-changer type disk player, the steps for loading and unloading the disks 2 or 7 are described as follows.

If a disk is selected (e.g., disk 7), the unshown motor is driven to drive the belts 17, 18 and 23, 24 to rotate on the axis of the brackets 19, 20, 21 and 22 as shown in FIG. 1. As the belts 17, 18 and 23, 24 rotate, the left frame 15 fixedly disposed on the belts 17, 18 and the right frame 16 fixedly disposed on the belts 23, 24 am moved upward. Each of the motors (FIG. 1 illustrates the motor 25 only) fixedly disposed on the right and left sides of the chassis 1 has the same rotation speed, and the rotation speed of the belts 17, 18 is the same as that of the belts 23, 24. Thus, the speed of the up-down movement of the left frame 15 fixedly combined to the belts 17, 18 is equal to that of the right frame 16 fixedly combined to the belts 23, 24.

As the left and right frames 15 and 16 move up and down, the disk transferring device formed of the lower frame 14, chuck transferring body 13 and chuck 12 is moved upward. If the disk transferring device moving upward is located at a predetermined height by a user, for example, in front of the disk 7, the right and left motors stop rotating thereby to stop the rotation of the belts 17, 18 and 23, 24. Accordingly, the upward movement of the disk transferring device stands still.

After that the chuck transferring body 13 within the disk transferring device moves to the right cartridge 8 securing the disk 7 designated by the user, by the motor (not shown) for driving the chuck transferring body.

If the movement of the chuck transferring body 13 is finished, the motor (not shown) for driving the chuck transferring body stops operating, and the motor (not shown) for driving the chucks 12 mounted on the upper portion of the chuck transferring body 13 operates for adjusting the space therebetween to clamp the disk 7.

If the disk 7 is completely clamped between the chucks 12, the chucks 12 are moved to the chuck transferring body 13 by the motor for driving the chucks 12 (not shown). If the chucks 12 are located at the chuck transferring body 13, the motor for driving the chuck transferring body 13 operates again to move the chucks 12 and the chuck transferring body 13 left where the first reproducing means (e.g., the reproducing means 5) is located.

After the chuck transferring body 13 moves to the left to the location of the first reproducing means 5, the motor (not shown) for driving the chuck transferring body 13 stops operating, and the pair of the motors (FIG. 1 illustrates the motor 25 only) fixedly disposed on the right and left sides of the chassis 1, are driven to move the disk transferring device 13 downward to the location of the first reproducing means 5.

If the disk transferring device 13 is disposed in front of the first reproducing means 5, the pair of the motors (FIG. 1 illustrates the motor 25) stop operating, and the motor for driving the chucks 12 (not shown) operates to move the chucks 12 clamping the disk 7 to the first reproducing means 5.

If the disk 7 is mounted completely on the first reproducing means 5, the first reproducing means 5 carries out a reproducing operation, and at the same time, the motor (not shown) for driving the chucks 12 operates to move the chucks 12 to the chuck transferring body 13.

If the chucks 12 are disposed on the chuck transferring body 13, the motor (not shown) for driving the chucks 12 stops operating and the disk transferring device 13 is disposed in from of the first reproducing means 5 until the reproducing operation of the disk 7 is completed.

If the reproducing operation of the disk 7 inside the first reproducing means 5 is completed, the motor for driving the chucks 12 operates to move the chucks 12 to the first reproducing means 5, and to clamp the disk 7 in the first reproducing means 5.

If the disk 7 is clamped on the chucks 12, the motor for driving the chucks 12 (not shown) moves the chucks 12 to the chuck transferring body 13, and when the chucks 12 clamping the disk 7 therein are disposed on the upper portion of the chuck transferring body 13, the motor for driving the chuck transferring body 13 (not shown) is driven to move the chuck transferring body 13 to the cartridge 8 from which the disk 7 was seized at an initial stage.

If the chuck transferring body 13 is moved right, the motor (not shown) for driving the chuck transferring body 13 stops operating, and the pair of motors (FIG. 1 illustrates the motor 25 only) fixedly disposed on the right and left sides of the chassis 1 are driven to move the disk transferring device upward.

If the disk transferring device is moved to a position where the disk 7 was seized, the motor (not shown) for driving the chuck transferring body 13 stops operating, and the motor for driving the chucks 12 (not shown) is operated to move the chucks 12 clamping the disk 7 therein to the cartridge 8.

If the disk 7 clamped between the chucks 12 is located at a predetermined position from which the disk 7 was seized at the initial stage, the chucks 12 adjust the space therebetween for securing the disk safely on the rester 9 inside the cartridge 8. The reproducing operation of the one disk 7 is completed then.

The following is a case that the user wants to continuously reproduce a plurality of disks (e. g., disks 2 and 7).

If another disk is selected by a user and it is assumed that the disk 7 is reproduced after reproducing the disk 2, the motors (FIG. 1 illustrates the motor 25 only) are driven to rotate the belts 17, 18 and 23, 24 on the axis of the brackets (only 19, 20 and 21, 22 only shown in FIG. 1).

As the belts 17, 18 and 23, 24 are rotated, the left frame 15 fixedly disposed on the belts 17, 18 and the right frame 16 fixedly disposed on the belts 23, 24, move upward and thereby the disk transferring device including the lower frame 14, chuck transferring body 13 and chucks 12 are moved upward.

If the disk transferring device being moved upward becomes located at a predetermined position where the disk 2 is located, the pair of motors (FIG. 1 illustrates the motor 25 only) stops rotating, and in response thereto the belts 17, 18 and 23, 24 stop rotating. Accordingly, the upward movement of the disk transferring device stops.

After that, the chuck transferring body 13 disposed in the disk transferring device is moved by the motor for driving the chuck transferring body 13 to the left cartridge 3 securing the disk 2 selected by the user.

If the movement of the chuck transferring body 13 is completed, the motor (not shown) for driving the chuck transferring body 13 stops operating, and the motor (not shown) for driving the chucks 12 disposed on the upper portion of the chuck transferring body 13 is operated to adjust the space between the chucks 12 for clamping the selected disk 2.

If the disk 2 is completely clamped in the chucks 12, the chucks 12 are moved to the chuck transferring body 13 by the motor for driving the chucks 12 (not shown). If the chucks 12 are disposed on the chuck transferring body 13, the motor (not shown) for driving the chuck transferring body 13, operates again to move the chucks 12 and the chuck transferring body 13 to the right side, where the first reproducing means (e.g., the reproducing means 5) is located. Since the chuck transferring body 13 that seizes the disk 2 is already located at the left side and it is not necessary to move the chuck transferring body 13 left, the motor (not shown) for driving the chuck transferring body 13 does not operate.

If the left movement of the chuck transferring body 13 is finished, the motor (not shown) for driving the chuck transferring body 13 stops operating, and the pair of the motors (FIG. 1 illustrates the motor 25 only) fixedly mounted on the left and right sides of the chassis 1 operate to move the disk transferring device down to where the first reproducing means 5 is located.

If the disk transferring device is located in from of the first reproducing means 5, the pair of the motors (FIG. 1 illustrates the motor 25) stop operating, and the motor (not shown) for driving the chucks 12 operates to move the chucks 12 clamping the disk 2 to the first reproducing means 5.

If the disk 2 is completely mounted on the first reproducing means 5, the first reproducing means 5 carries out the reproducing operation, and at the same time, the motor (not shown) for driving the chucks 12 operates to move the chucks 12 to the chuck transferring body 13.

If the chucks 12 are disposed on the chuck transferring body 13, the motor (not shown) for driving the chucks 12 stops operating. The pair of the motors (FIG. 1 illustrates only motor 25) fixedly disposed on the left and right sides of the chassis 1 operate again to move the disk transferring device up to a height where the designated second disk 7 is located. If the disk transferring device is moved to that position, the pair of motors (FIG. 1 illustrates only motor 25) stop operating.

After that, the chuck transferring body 13, located inside the disk transferring device, is moved by the motor for driving the chuck transferring body 13 to the right cartridge 8, securing the selected disk 7. If the chuck transferring body 13 movement is finished, the motor (not shown) for driving the chuck transferring body 13 stops operating, and the motor (not shown) for driving the chucks 12 mounted on the upper portion of the chuck transferring body 13, operates to adjust the space between the chucks 12 for clamping the selected disk 7.

If disk 7 is completely clamped by the chucks 12, the chucks 12 are moved to the chuck transferring body 13 by the motor (not shown) for driving the chucks, and if the chucks 12 are disposed on the chuck transferring body 13, the motor (not shown) for driving the chuck transferring body 13 again operates to move the chucks 12 and the chuck transferring body 13 to the left where the second reproducing means (e.g., a reproducing means 6) is located.

If the chuck transferring body 13 is moved completely to the left where the second reproducing means 6 is located, the motor (not shown) for driving the chuck transferring body 13 stops, and the pair of motors (FIG. 1 illustrates only motor 25) fixedly disposed on the right and left sides of the chassis 1 are driven to move the disk transferring device down to where the designated second reproducing means 6 is located.

If the disk transferring device is disposed in front of the second reproducing means 6, the pair of motors (FIG. 1 illustrates only motor 25) stop, and the motor for driving the chucks 12 (not shown) operates to move the chucks 12, mounting disk 7 into the second reproducing means 6.

If the disk 7 is completely mounted on the second reproducing means, the second reproducing means 6 is placed in a standby state, waiting to perform a reproducing operation, until the reproducing operation of the first reproducing means 5 is finished.

Simultaneously, the motor (not shown) for driving the chucks 12 operates to move the chucks 12 to the chuck transferring body 13. If the chucks 12 are disposed on the chuck transferring body 13, the motor (not shown) for driving the chucks 12 stops operating, and the motor (not shown) for driving the chuck transferring body 13 operates to move the chuck transferring body 13 to the left where the first reproducing means 5 is located. The second reproducing means 6 and the first reproducing means 5 are positioned towards the left side of chassis 1, and so it is not necessary to separately operate the motor (not shown) for driving the chuck transferring device.

If the chuck transferring body 13 is completely moved to the left where the first reproducing means 5 is located, the pair of motors (FIG. 1 illustrates only motor 25) operate to move the disk transferring device to a height where the first reproducing means is located.

If the disk transferring device is moved to a height where the first reproducing means 5 is located, the pair of motors (FIG. 1 illustrates only motor 25) stop operating, and finally, the disk transferring device stands still in front of the first reproducing means 5 until the reproducing operation of disk 2 is finished. If the reproducing operation of disk 2 inside the first reproducing means is finished, disk 7 mounted in the second reproducing means 6 begins to perform its reproducing operation, and at the same time, the motor (not shown) for driving the chucks 12 operates to move the chucks 12 to the first reproducing means 5 and thereby to clamp disk 2 inside the first reproducing means 5.

If disk 2 is completely clamped by the chucks 12, the motor (not shown) for driving the chucks 12 moves the chucks 12 to the chuck transferring body 13. If the chucks 12 clamping disk 2 are disposed on the upper portion of the chuck transferring body 13, the motor (not shown) for driving the chuck transferring body 13 is driven to move the chuck transferring body 13 to the left cartridge 3 from which the disk 2 was seized during the initial stage.

Since the first reproducing means 5 is located on the left side of the chassis 1 and it is not necessary to move the chuck transferring body 13 to the left any more, the motor (not shown) for driving the chuck transferring body 13 stops operating.

If the chuck transferring body 13 is moved to the left, the motor (not shown) for driving the chuck transferring body 13 stops operating and the pair of motors (FIG. 1 illustrates only motor 25) fixedly mounted in the left and right sides of the chassis 1, are driven to move the disk transferring device upward.

If the disk transferring device is moved to a height where disk 2 was seized during the initial stage, the motor (not shown) for driving the chuck transferring body 13 stops operating and the motor (not shown) for driving the chucks 12 operates to move the chucks 12 clamping the disk 2 to the cartridge 3.

If the chucks 12 clamping disk 2 are located at the predetermined position where disk 2 was seized during the initial stage inside the left cartridge 3, the chucks 12 adjust the space therebetween to safely secure the disk 2 on the rester 4 inside the left cartridge 3.

If disk 2 is completely returned inside the left cartridge 3, the chucks 12 are moved to the chuck transferring body 13 by the motor for driving the chucks 12 (not shown), and if the chucks 12 are disposed on the chuck transferring body 13, the motor (not shown) for driving the chuck transferring body 13 operates again to move the chucks 12 and the chuck transferring body 13 to the designated second reproducing means 6. Since the left cartridge 3 is disposed on the left side of the chassis 1, it is not necessary to move the chuck transferring body 13 left, and the motor (not shown) for driving the chuck transferring body 13 does not operate.

If the chuck transferring body 13 is moved completely to the left where the second reproducing means 6 is located, the motor (not shown) for driving the chuck transferring body 13 stops operating, and the pair of motors (FIG. 1 illustrates only motor 25) fixedly disposed on the left and right sides of chassis 1, are driven to move the disk transferring device down to where the second reproducing means 6 is located.

If the disk transferring device are disposed in front of the second reproducing means 6, the pair of motors (FIG. 1 illustrates only motor 25) stops operating, and the disk transferring device is placed in a standby state until the disk 7 inside the second reproducing means 6 is completely reproduced.

If the reproducing operation of the disk 7 inside the second reproducing means 6 is finished, the motor (not shown) for driving the chucks 12 operates to move the chucks 12 to the second reproducing means 6 to clamp the disk 7 inside the second reproducing means 6.

If the disk 7 is completely clamped by the chucks 12, the motor (not shown) for driving the chucks 12 operates to move to the chuck transferring body 13. If the chucks 12 clamping the disk 7 are located over the chuck transferring body 13, the motor (not shown) for driving the chuck transferring body 13 operates to move the chuck transferring body 13 to the right cartridge 8 from which the disk was seized during the initial stage.

If the chuck transferring body 13 is moved to the right; the motor (not shown) for driving the chuck transferring body 13 does not operate and the pair of motors (FIG. 1 illustrates only motor 25) fixedly mounted on the left and right sides of the chassis 1 are driven to move the disk transferring device upward.

If the disk transferring device is moved to a height where the disk 7 was seized during the initial stage, the motor (not shown) for driving the chuck transferring body 13 stops operating, and the motor (not shown) for driving the chucks 12 operates to move the chucks 12 clamping the disk 7 to the right cartridge 8.

If the chucks 12 clamping the disk 7 are disposed on an objective position (where the disk 7 was seized during the initial stage) inside the cartridge 8, the chucks 12 adjust the space therebetween to safely secure the disk 7 on the rester 9 inside the right cartridge 8.

The reproducing operation of the plurality of disks 2, 7 is finished.

U.S. Pat. No. 4,853,916 discloses an auto-changer disk player as shown in FIG. 2 which is similar to FIG. 1. Therefore, only the differences with FIG. 1 are described hereinafter omitting description of the similar parts.

The steps for reproduction of disk 2 are as follows (see FIG. 2).

If the disk 2 is selected by a user, a motor 25 operates to rotate a belt 17 connected to motor 25. If belt 17 rotates, a disk transferring device (referred to as "rotating body" in FIG. 2) formed integrally with belt 17 is moved by the user to a position where disk 2 is located. A pair of chucks (not shown) inside the disk transferring device is moved to a cartridge 3 and the chucks seize disk 2 stored in cartridge 3.

If the disk 2 is completely removed, the chucks (not shown) with the disk 2 removed by the chucks are returned to the disk transferring device. The disk transferring device is rotated between 0°–180° (e.g., 180°) in to search a portion of the disk to be reproduced. Disk 2 is rotated by the rotational power of a gear 27 located on the axis of a base frame 26. The disk 2 is then moved to a first reproducing means (e.g., a reproducing means 5) by motor 25.

If the disk transferring device is moved to the position where the first reproducing means 5 is located, motor 25 stops operating and the chucks (not shown) are moved to the first reproducing means 5. As the chucks (not shown) are moved to first reproducing means 5, disk 2 is moved to the front and is inserted into the first reproducing means 5.

If disk 2 is inserted into the first reproducing means 5, the reproducing means 5 carries out a reproducing operation of the disk 2, and the chucks (not shown) are returned to the disk transferring device. After the chucks (not shown) have been returned to the disk transferring device, the disk transferring device is placed in a standby state in front of the first reproducing means 5 until disk 2 inside the first reproducing means 5 is completely reproduced.

If the reproducing operation is completed, the chucks (not shown) inside the disk transferring device are moved to the front, and the disk inside the first reproducing means is pulled out and safely mounted on the disk transferring device. The disk transferring device is reversely rotated (e.g., –180°) by the amount the disk transferring device was rotated during the initial stage for searching the portion of the disk to be reproduced, so as to be returned to the first position. If the disk transferring device is returned to the first position, motor 25 is driven to move the disk transferring device upward to a position from which disk 2 was seized. When the movement of the disk transferring device is finished, motor 25 stops operating.

If motor 25 stops, the chucks (not shown) inside the disk transferring device and disk 2 fixed by the chucks are moved to the front, and the chucks (not shown) secure the disk 2 on the cartridge 3, thereby completing the reproducing operation of disk 2.

The steps for reproducing the plurality of disks 2 and 7 are described hereinafter.

If disk 2 is selected by the user and it is assumed that disk 7 is continuously selected after disk 2, motor 25 is operated to rotate a belt 17 connected to motor 25. When belt 17 is rotated, the disk transferring device mounted integrally with belt 17 is moved to a position where disk 2, which the user selected, is located, and the chucks (not shown) inside the disk transferring device move to cartridge 3 to seize disk 2 which is stored in cartridge 3.

If disk 2 is completely removed from cartridge 3, the chucks (not shown) and disk 2 are returned to the disk transferring device. The disk transferring device is rotated by 0°–180° (e.g., at 180°) to search a portion of the disk 2 to be reproduced, by providing rotational power to gear 27 located on the axis of base frame 26, and moves to a first reproducing means (e.g., a reproducing means 5) by motor 25.

If the disk transferring device is moved to the position where the first reproducing means 5 is located, motor 25 stops operating and the chucks (not shown) move to the first reproducing means 5. As the chucks (not shown) move to the first reproducing means 5, disk 2 is moved forward and inserted into the first reproducing means 5. When disk 2 is completely inserted to the first reproducing means 5, the first reproducing means 5 carries out the reproducing operation on the inserted disk 2, and the chucks (not shown) are returned to the disk transferring device.

If the chucks (not shown) are completely returned to the disk transferring device, motor 25 operates to rotate belt 17 connected to the motor. If belt 17 rotates, a disk transferring device formed integrally with belt 17 is moved to a position where disk 7 is located, disk 7 being selected by the user. The chucks (not shown) inside the disk transferring device move to a cartridge 3 and seize disk 7 stored in cartridge 3.

If disk 7 is completely removed from cartridge 3, the chucks (not shown) and disk 7 are returned to the disk transferring device. The disk transferring device is rotated by 0°–180° (e.g., at 180°) to search a portion of disk 7 to be reproduced, by providing rotational power to gear 27 located on the axis of base frame 26, and the disk transferring device is moved to a second reproducing means (e.g., a reproducing means 6) by motor 25.

If the disk transferring device is moved to the position where the second reproducing means 6 is located, motor 25 stops operating and the chucks (not shown) move to the second reproducing means 6. As the chucks (not shown) move to the second reproducing means 6, disk 7 moves forward to be inserted into the second reproducing means 6.

If disk 7 is completely inserted into the second reproducing means 6, the second reproducing means 6 is placed in a standby state to perform the reproducing operation of the inserted disk 7, and simultaneously, the chucks (not shown) are returned to the disk transferring device.

If the chucks (not shown) are completely returned to the disk transferring device, motor 25 operates to move the disk transferring device to a position where the first reproducing means 5 is located. Then, motor 25 stops operating and the disk transferring device waits in front of the first reproducing means 5 until the reproducing operation of disk 7 inside the first reproducing means 5 is completed.

If the reproducing operation is completed, the chucks (not shown) inside the disk transferring device move forward, and the disk inside the first reproducing means is pulled out to be safely mounted on the disk transferring device. The disk transferring device is reversely rotated (–180°) by the amount the disk transferring device was rotated at the initial stage for searching the portion of disk to be reproduced. The disk transferring device is then returned to the first position. If the disk transferring device is returned to the first position, motor 25 is driven to move the disk transferring device upward to a position from which disk 7 was seized. When the movement of the disk transferring device is finished, motor 25 stops operating.

If motor 25 stops operating, the chucks (not shown) inside the disk transferring device and disk 2 fixed by the chucks are moved forward for securing disk 2 on cartridge 3, thereby to complete the reproducing operation as to disk 7.

If disk 7 is mounted on cartridge 3, the chucks (not shown) are returned to the disk transferring device and then motor 25 operates to move the disk transferring device to a position where the second reproducing means 6 is located.

If the disk transferring device moves to the position where the second reproducing means 6 is located, the motor stops operating and remains in a standby state until the reproducing operation of disk 7 mounted in the second reproducing means 6 is completed.

After the reproducing operation of disk 7 mounted in the second reproducing means 6, the chucks (not shown) inside the disk transferring device move forward, and the disk inside the first reproducing means is pulled out to be safely mounted on the disk transferring device. The disk transferring device is reversely rotated (−180°) by an mount the disk transferring device was rotated during the initial stage, for searching the portion of the disk to be reproduced. The disk transferring device is then returned to the first position. If the disk transferring device is returned to the first position, motor 25 is driven to move the disk transferring device upward to a position from which disk 2 was seized. When the movement of the disk transferring device is finished, motor 25 stops operating.

The reproducing operation as to the plurality of disks 2, 7 is then finished.

In the conventional auto-changer disk player as shown in FIG. 1, since the disk transferring device is moved vertically up and down by the belts connected to the left and right frames inside the disk transferring device, there occurs an error in the horizontal state of the disk transferring device due to the error of the length of each belt or due to the expansion of the aged belts. When such errors occur, the disk transferring device cannot exactly mount or remove the selected disks.

As shown in FIG. 2, there are frequent occasions when the disk transferring device does not exactly rotate by a predetermined degree, for example 180°, because of mechanical errors. This inexact rotation causes errors in the horizontal movement.

SUMMARY OF THE INVENTION

This invention is proposed in an effort to solve the above-mentioned problems of the prior art systems.

It is an object of the present invention to provide a circuit for correcting a horizontal state of a disk transferring device that can correct the error in the horizontal state of the disk transferring device and load and unload a disk exactly by installing sensors on left and right frames, forming grooved portions on the left and right sides of the chassis, and operating an auxiliary motor according to the condition of the grooves at a position where a disk transferring device stops.

It is a further object of this invention to provide a method for correcting a horizontal state of a disk transferring device by comparing a location of a left frame with that of a right frame perceived by a sensor so as to determine a rotation direction of an auxiliary motor, integrating a pulse produced after each location of the left and right frames is compared, and then driving the auxiliary motor according to the compared value.

In order to achieve the above-mentioned objects, in a circuit for correcting a horizontal state of a disk transferring device including chucks for clamping a selected disk from a cartridge, a chuck transferring body for transferring the chucks horizontally right and left, a lower frame combined with the chucks and the chuck transferring body to move the chucks and chucks transferring body horizontally left and right, and first and second frames formed integrally with the chucks, the chucks transferring body and the lower frame, being fixedly connected to belts for moving the chucks, the chuck transferring body and the lower frame vertically up and down, the combination therewith comprises:

a detecting circuit for determining a right height and a left height of the disk transferring device to detect an error in a horizontal state;

a comparing circuit for comparing an amount of error in the left and right horizontal states detected by the detecting circuit;

a controlling circuit for determining a rotating direction of correction motors according to the error in the horizontal state detected by the detecting circuit; and a correcting circuit for driving the correction motors as much as the amount of error compared by the comparator to correct the horizontal state of the disk transferring device.

The detecting circuit includes a first chassis having a plurality of grooves repeatedly formed by a same interval to determine the horizontal state of the disk transferring device; a first sensor formed adjacently to the first chassis and mounted at a predetermined position of the first frame to determine the state of the grooves in the first chassis; a second chassis having a plurality of grooves repeatedly formed with a same interval as in the first sensor to determine the horizontal state of the disk transferring device; and a second sensor formed adjacent to the second chassis and mounted at a predetermined position correspondingly to the first sensor to determine the state of the grooves in the second chassis.

In addition, the comparing circuit includes:

a location comparator simultaneously applied with a pulse indicating a state of each groove of the first and second chassis, detected respectively by the first and the second sensors for comparing positions of the first and the second sensors located in the first and the second chassis to detect each pulse difference;

a pulse width converter for enlarging a width of the pulse detected by the location comparator;

an integrator for integrating the pulse enlarged through the pulse width converter;

a reference voltage generator for generating a reference voltage pulse; and a pulse comparator for comparing the pulse integrated by the integrator with the reference voltage pulse produced from the reference voltage generator to detect a difference of each pulse.

The controlling circuit includes a microcomputer determining a rotation direction of the correction motors according to a pulse detected by the location comparator in the comparing circuit.

The correcting circuit includes:

a motor driver determining an amount of rotation of the correction motors according to the difference between the integrated pulse and the reference voltage pulse detected by the pulse comparator in the comparing circuit; and a modulator reversing a phase of a pulse produced from the motor driver to output such a reversed pulse to the correction motors.

The correction motors are mounted on either the left or right side of the lower frame for correcting errors of either of the left or right side in the horizontal state of the disk transferring device. The correction motors may be also mounted above or underneath the lower frame to correct the horizontal state of the disk transferring device. Further, the correction motors may be provided in pairs, either on the left and right sides of the lower frame, or above and underneath the lower frame, so as to move both sides of the disk transferring device simultaneously for rapidly correcting the horizontal sate, or so as to rotate the lower frame in one direction for moving up or down.

The correction motor includes:
a first correction motor rotatable in two directions so as to move the first frame up and down; and
a second correction motor rotating in an opposite direction to that of the first correction motor and rotatable in two directions so as to move the second frame up and down.

A method for correcting the horizontal sate of the disk transferring device comprises the steps of:
outputting light signals respectively to grooves formed on the first and the second chassis for providing pulse signals according to the light signals respectively reflected by the grooves;
comparing a difference of the provided pulses for detecting different pulse parts from each other;
determining a rotating direction of the correction motors simultaneously with integrating the pulses detected by the different parts from each other;
comparing the integrated pulse with a reference voltage pulse; and
determining an amount of rotation of the correction motors according to the compared value for driving the correction motors according to the rotating direction.

Where, if there are a plurality of the correction motors, the rotating directions of correction motors may be fixed to one direction respectively and so it is preferable to substitutionally perform a step for determining the rotating direction of the correction motors opposite to each other.

BRIEF DESCRIPTION OF THE DRAWINGS

FIGS. 6A, 7A and 8A are waveform diagrams showing the output of the left sensor shown in FIG. 5;

FIGS. 6B, 7B and 8B are waveform diagrams showing the output of the right sensor shown in FIG. 5;

FIGS. 6C, 7C and 8C are waveform diagrams showing the output of the location comparator shown in FIG. 5;

FIGS. 6D, 7D and 8D are waveform diagrams showing the output of the pulse width converter shown in FIG. 5;

FIGS. 6E, 7E and 8E are waveform diagrams showing the output of the integrator shown in FIG. 5;

FIGS. 6F, 7F and 8F are waveform diagrams showing the output of the reference voltage generator shown in FIG. 5;

FIGS. 6G, 7G and 8G are waveform diagrams showing the signals, superimposed on one another, input to the pulse comparator shown in FIG. 5;

FIGS. 6H, 7H and 8H are waveform diagrams showing the output of the pulse comparator shown in FIG. 5;

FIGS. 6I, 7I and 8I are waveform diagrams showing the output of the motor driver shown in FIG. 5;

FIGS. 6J, 7J and 8J are waveform diagrams showing the output of the modulator shown in FIG. 5; and FIGS. 9A and 9B are schematic views for explaining the determination of rotation directions of motors by a microcomputer shown in FIG. 5.

DETAILED DESCRIPTION OF A PREFERRED EMBODIMENT

A preferred embodiment of the present invention is now described in detail with reference to the attached drawings.

Figure 1:
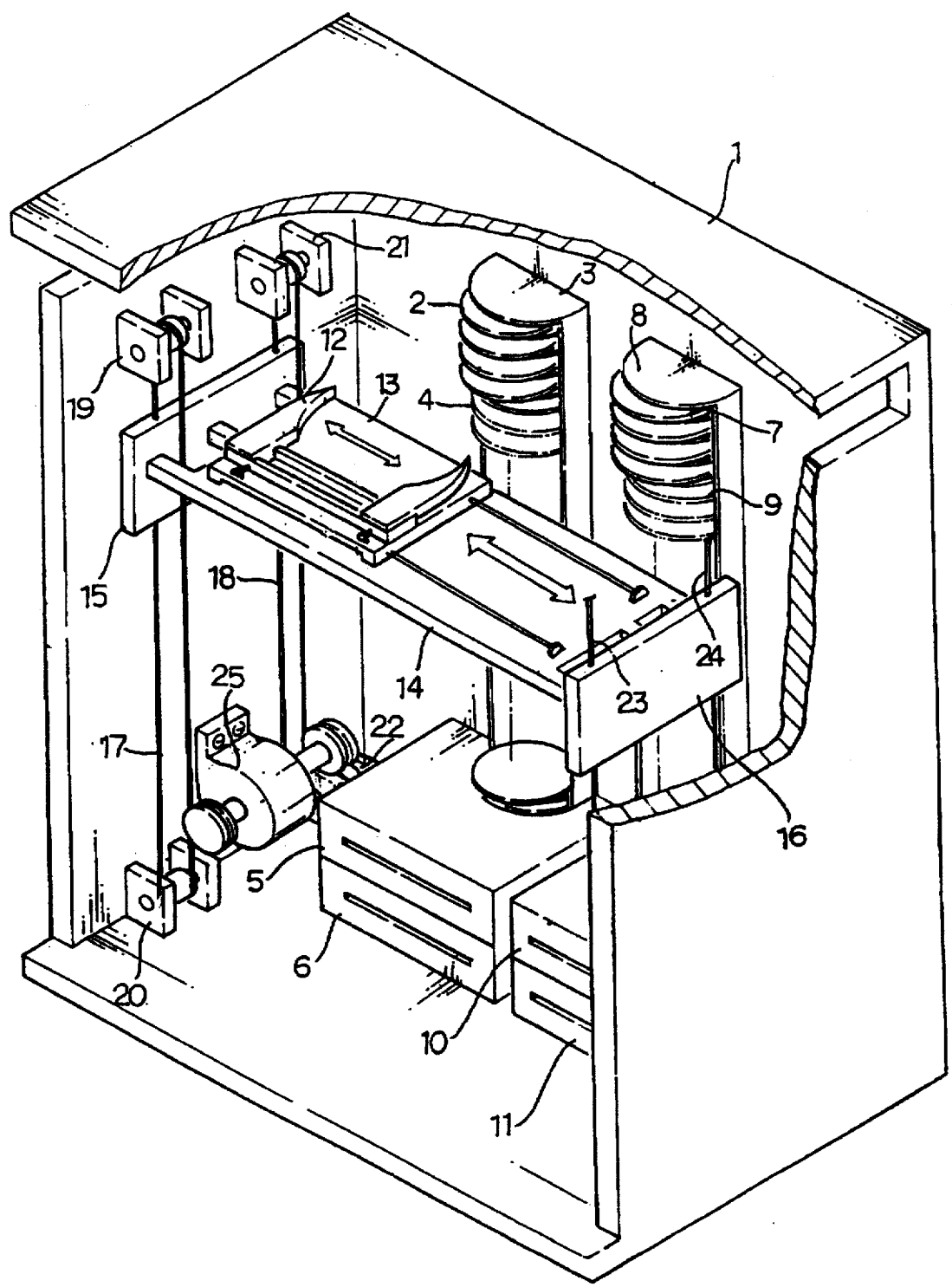
FIGS. 1 and 2 are schematic perspective views of a conventional auto-changer type disk player.
Figure 2:
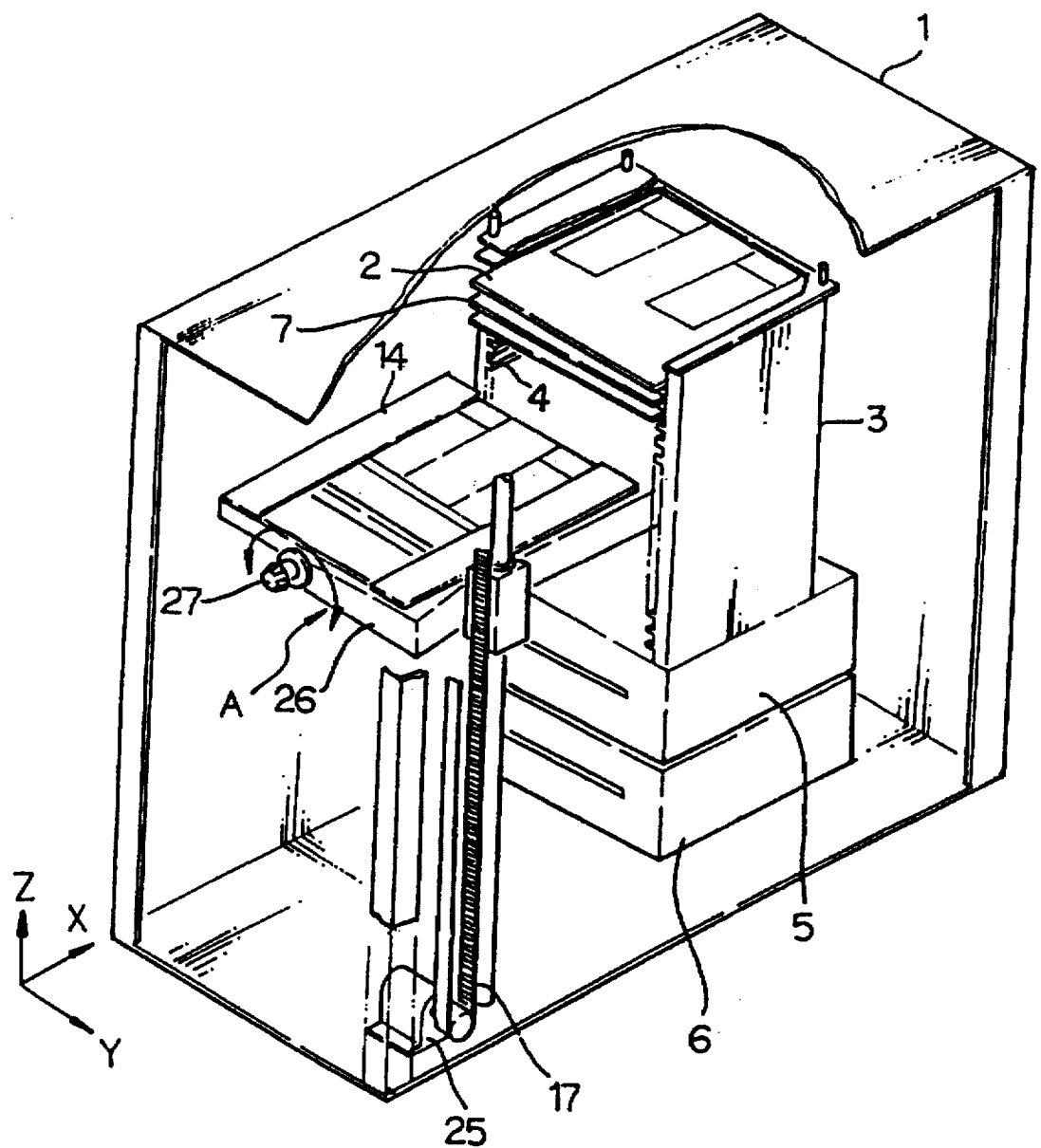
Figure 3:
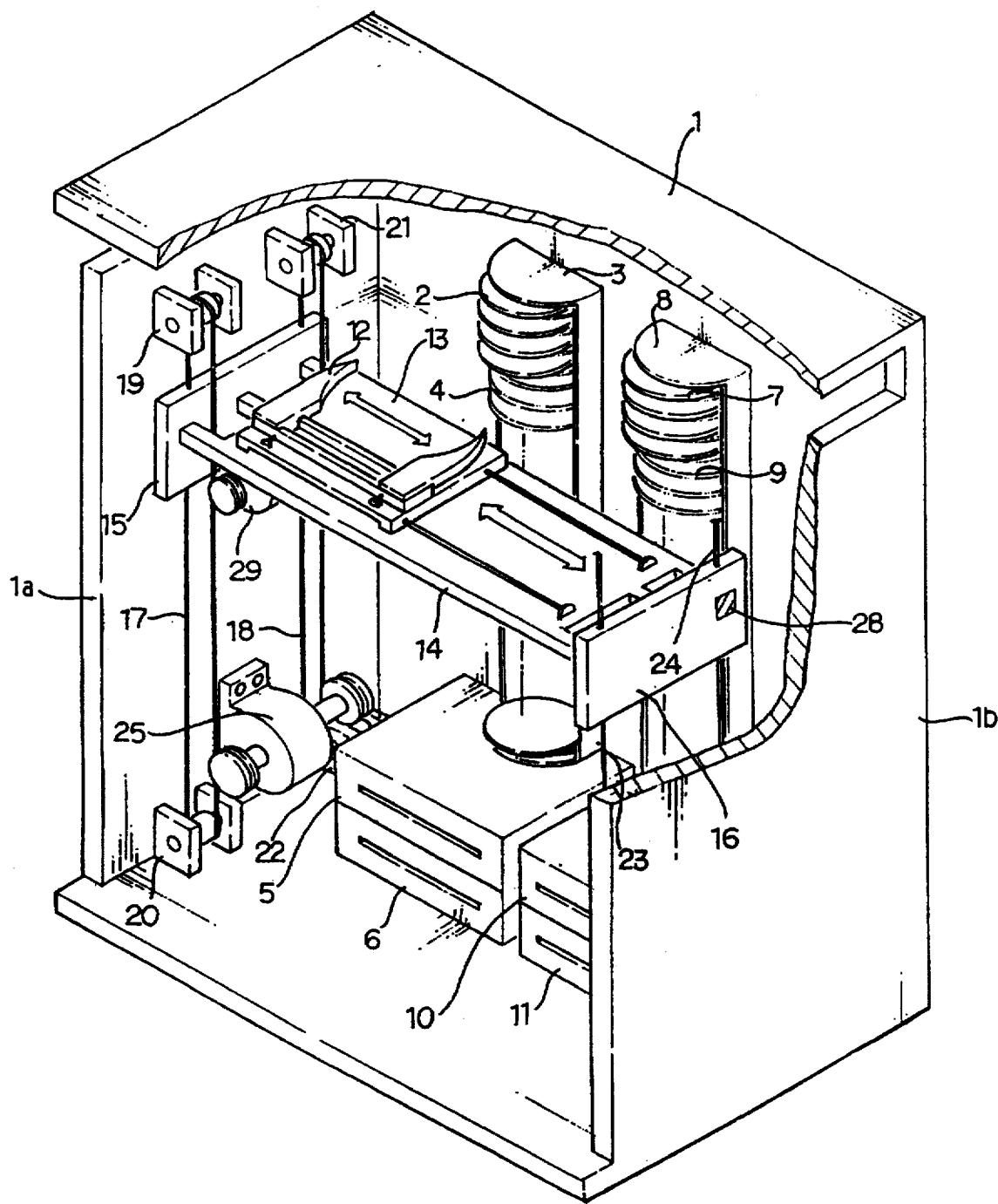
FIG. 3 is a schematic perspective view of a preferred embodiment of the auto-changer type disk player according to the present invention.

FIG. 3 is a schematic perspective view of an auto-changer disk player in accordance with the present invention. Like reference numerals and letters designate like parts throughout the specification.

Referring to FIG. 3, the auto-changer disk player has a left side chassis 1a and a right side chassis 1b, each having inside surfaces facing one another, in which both left and right side chassis form the outside surface of the auto-changer disk player. A left sensor (not shown) is installed on an outside surface of a left frame 15 to face the inside surface of the left side chassis 1a, and a right sensor 28 is installed on an outside surface of a right flame 16 to face the inside surface of the right side chassis 1b. At this time, the right sensor 28 and the left sensor (not shown) are installed at the same position on the outside surfaces of the respective left and right frames 15 and 16.

Underneath and on the right side of a lower frame 14, a correction motor 29 is mounted to be combined with belts 17 and 18 for moving a disk transferring device by an amount corresponding to an error in a horizontal state of the disk transferring device detected by the right and left sensors, so as to correct the horizontal error of the disk transferring device.

Figure 4:
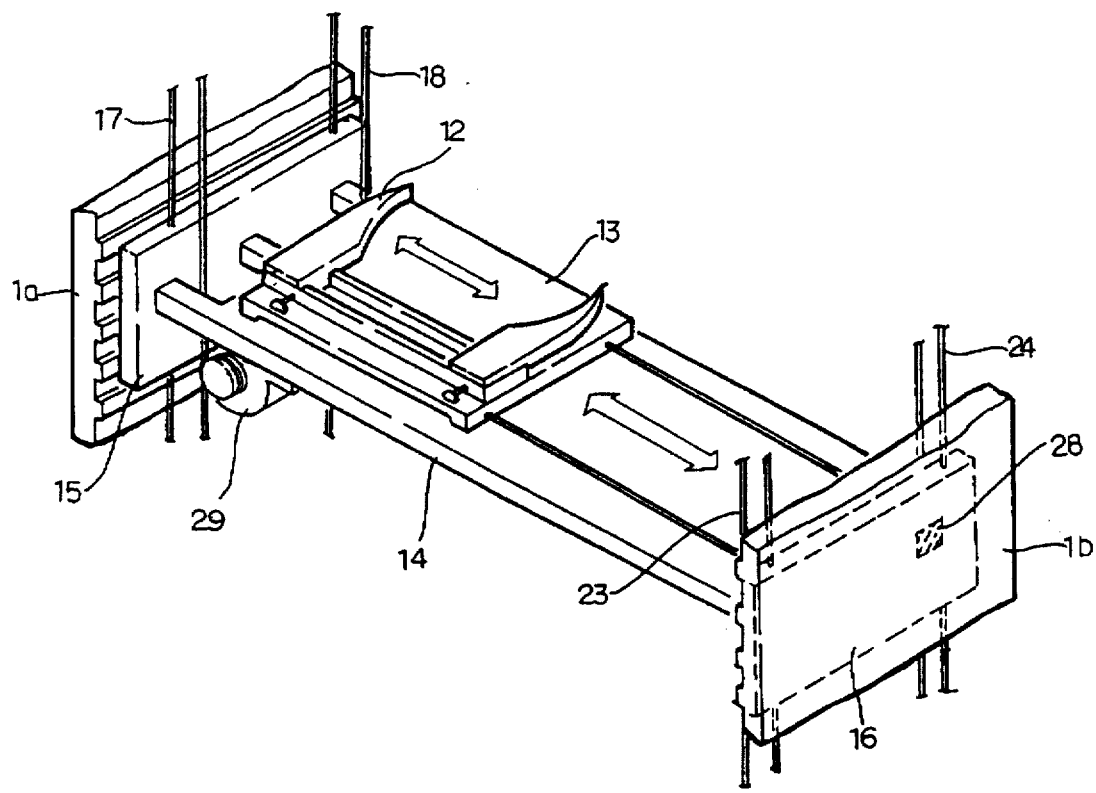
FIG. 4 is a detailed perspective view of the principal parts of the auto-changer type disk player of FIG. 3.

As shown in FIG. 4, a plurality of grooves having an equally spaced vertical interval between adjacent grooves, are provided on the inside surfaces of both the left and right side chassis 1a and 1b. The inside surfaces of the left and right frames 15 and 16 face each other, and the left and right frames 15 and 16, move up and down parallel to the inside surfaces of the left and right side chassis 1a and 1b, respectively. Accordingly, the sensors (FIG. 4 shows sensor 28 only) installed on the outside surfaces of the left and right side frames 15 and 16 can sense the grooves on the inside surface of the left and right side chassis 1a and 1b.

The operation of the present invention is described as follows.

If a disk is selected by a user (e.g., disk 2), a pair of left and right motors (FIGS. 3 and 4 show motor 25 only) fixedly mounted on the left side chassis 1a and right side chassis 1b are driven to operate belts 17, 18, 23 and 24. When the belts are operated, the disk transferring device including the left frame 15 fixedly mounted on the belts 17, 18, the right frame 16 fixedly mounted on the belts 23, 24, the lower frame 14, chucks 12, and a chuck transferring body 13, is moved up or down parallel to the left and right side chassis 1a and 1b. The sensor (not shown in FIGS. 3 and 4) mounted on the outside surface of the left frame 15 and the sensor 28 mounted on the outside surface of the right frame 16 sense the condition of the grooves of the left side chassis 1a and right side chassis 1b.

The correction motor 29 is installed on the left side underneath the lower frame 14 formed inside the disk transferring device, and the condition of the grooves detected by the right sensor 28 on the basis of the condition of the grooves detected by the left sensor (not shown in FIGS. 3 and 4).

If a result of detecting the condition of the grooves formed on the chassis 1a, 1b which are detected and compared by the left sensor (not shown in FIGS. 3 and 4) and the right sensor 28, represents that the left frame 15 inclines down or up more than the right frame 16, the correction motor 29 mounted on the left side under the lower frame is operated to move the disk transferring device up or down and correct the error.

Now, referring to FIGS. 5 to 9, the steps for correcting an error in the horizontal state of the disk transferring device are explained in detail, where the correction is performed by detecting the condition of the grooves of the left side chassis 1a and the right side chassis 1b by the left sensor (not shown in FIGS. 3 and 4) and the right sensor 28, respectively.

Figure 5:
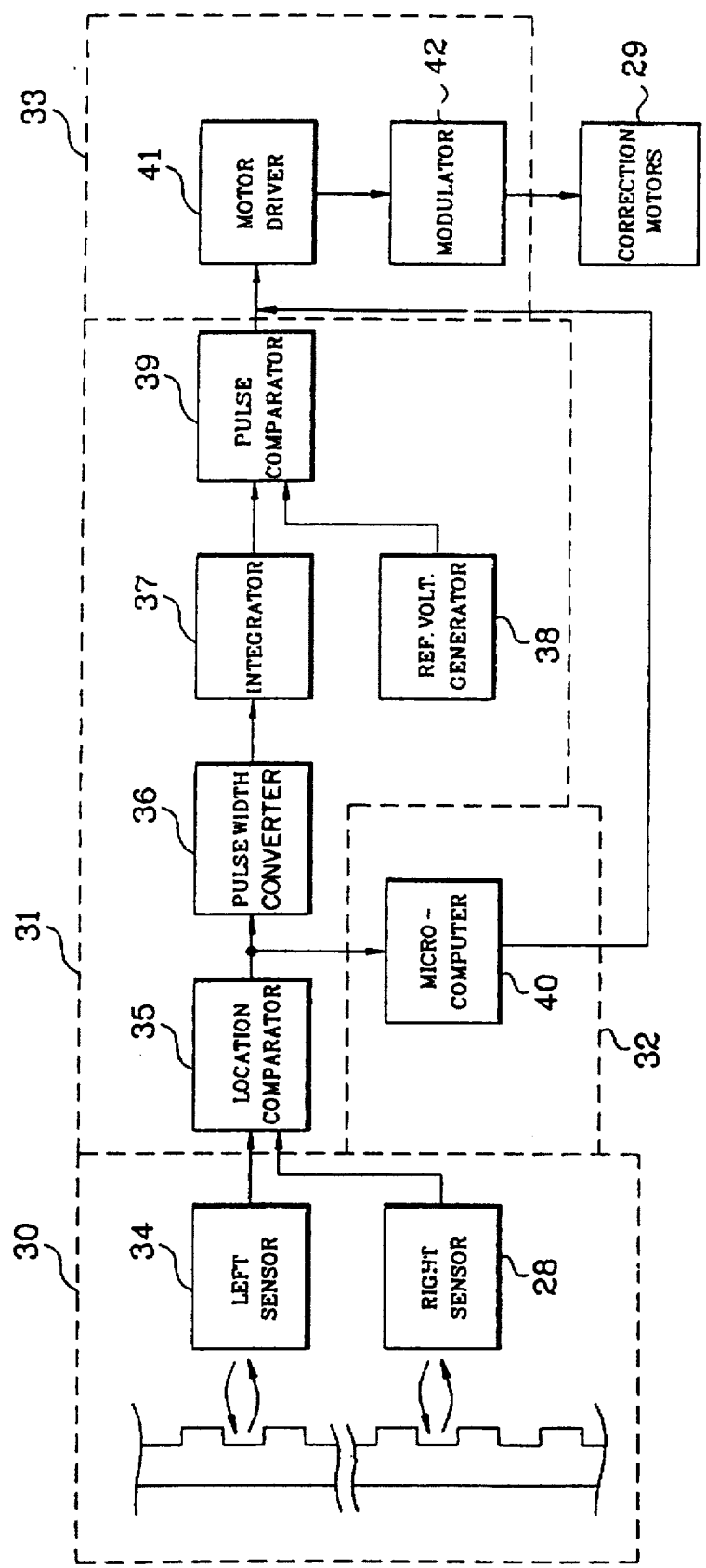
FIG. 5 is a block diagram of a horizontal state correction circuit of the auto-changer type disk player of FIG. 3.

Referring to FIG. 5, the correction circuit of the disk transferring device includes a detecting circuit 30 for detecting an error in a horizontal state of the left and right sides of the disk transferring device; a comparing circuit 31 for comparing an amount of the error in the horizontal state detected by the detecting circuit 30; a controlling circuit 32 for determining the rotation direction of the correction motor 29 according to the error in the horizontal state detected by the detecting circuit 30; and a correction circuit 33 for correcting the horizontal state of the disk transferring device by driving the correction motor 29 by an amount based on the error compared by the comparing circuit 31.

The correction circuit of the horizontal state of the disk transferring device is now described in detail.

The detecting circuit 30 includes the left side chassis 1a and the right side chassis 1b respectively having grooves which have an equally spaced vertical interval between adjacent grooves; the left sensor 34 which is mounted closely to the left side chassis 1a for detecting the condition of the grooves of the left side chassis 1a and produces a pulse based on the condition of the grooves; and the right sensor 28 which is mounted closely on the right side chassis 1b for detecting the condition of the grooves of the right side chassis 1b and produces a pulse based on the condition of the grooves.

The comparing circuit 31 includes a location comparator 35 simultaneously supplied with both pulses respectively indicating the conditions of the grooves of the left and right chassis 1a and 1b, respectively detected by the left and right sensors 34 and 28 formed in the detecting circuit 30, and outputting a pulse based on the input pulses; a pulse width converter 36 enlarging the width of the pulse output by the location comparator 35; an integrator 37 integrating the enlarged pulse from the pulse width converter 36; a reference voltage generator 38 generating a reference voltage; a pulse comparator 39 comparing the pulse integrated by the integrator 37 with the reference voltage pulse produced from the reference voltage generator 38 for detecting a difference therebetween.

The controlling circuit 32 includes a microcomputer 40 determining a rotating direction of the correction motor 29 according to the pulse output by the location comparator 35 formed in the comparing circuit 31.

The correction circuit 33 includes a motor driver 41 determining a rotation mount of the correction motor 29 according to the difference between the integrated pulse and the reference voltage pulse determined by the pulse comparator 39 and a modulator 42 reversing the pulse produced from motor driver 41, and outputting the reversed pulse to the correction motor 29.

Now, the operation of the horizontal state correction circuit of the disk transferring device is explained.

The left sensor 34 outputs a light signal to the left side chassis 1a and determines the condition of the light signal after being reflected by the left side chassis 1a and outputs a signal providing information about the reflected signal's condition, to the location comparator 35. In addition, the right sensor 28 outputs a light signal to the right side chassis 1b, and determines the condition of the light signal after being reflected by the right side chassis 1b to output a signal containing such information, to the location comparator 35. That is, if the left and right sensors 34, 28 are disposed respectively on raised portions between the grooves of the left and right chassis 1a and 1b, sensed values are provided by the light being reflected by the left and right chassis 1a and 1b, which attain a high level since the left and right sensors 34, 28 are close to the left and right chassis 1a and chassis 1b.

If the left and right sensors 34, 28 are disposed respectively across from the recessed portions of the grooves of the left and right chassis 1a and 1b, sensed values are provided by the light being reflected by the left and right chassis 1a and 1b, since the left and right sensors 34, 28 are far from the both chassis 1a and 1b.

The location comparator 35 compares the pulses respectively detected by the left and right sensors 34 and 28, and then outputs the compared result to the pulse width converter 36. The location comparator 35 outputs a high-level pulse if the pulses provided from both of the left and right sensors 34 and 28 are different from each other, and outputs a low-level pulse if the pulses provided the sensors 34 and 28 are equal to each other.

The pulse width converter 36 converts the pulse output from the location comparator 35 to have a predetermined size by enlarging both the pulse width and the period, and outputs the converted pulse to the integrator 37 to be integrated.

The pulse output from the location comparator 35 indicates the rotating speed of the pulse motor (FIGS. 3 and 4 illustrate motor 25) based on the amount of time to move the left and right sensors 34, 28 along the left and right chassis 1a and 1b. The pulse period is only about 100 μs. Since it is difficult to determine the amount of error in the horizontal state based on such a small pulse period, the pulse period is converted to be 100 times larger than the original 100 μs pulse period to have a period of about 10 ms.

The integrator 37 integrates the converted pulse output from the pulse width converter 36, and outputs the integrated pulse to the pulse comparator 39. In addition, the reference voltage generator 38 provides the pulse comparator 39 with a reference voltage pulse having the same predetermined period as that of the pulse generated from the pulse width converter 36. The pulse comparator 39 compares the reference voltage pulse applied from the reference voltage generator 38 with the integrated pulse applied from the integrator 37 and outputs the comparison result to motor driver 41.

The microcomputer 40 determines the rotation direction of the correction motor 29 according to the pulse produced from the location comparator 35, and generates this control signal to motor driver 41.

The motor driver 41 outputs the result compared by comparator 39, a driving pulse for driving the correction motor 29 according to the difference between the integrated pulse and the reference voltage pulse. The motor driver 41 outputs a low-level pulse provided the integrated pulse has a value larger than that of the reference voltage pulse, and outputs a high-level pulse provided the integrated pulse has a value smaller than that of the reference voltage pulse.

The modulator 42 reverses the output signal of the pulse motor driver 41. That is, if the output pulse of motor driver 41 attains a high level, it is reversed to attain a low level. If the output pulse of motor driver 41 attains a low level, it is reversed to attain a high level. If the output pulse of the modulator 42 outputs a high level, the correction motor 29 is operated to move the disk transferring device, and if the output pulse of the modulator 42 outputs a low level, the correction motor 29 is not operated.

Referring now to FIGS. 6 to 9, each case corresponding to the horizontal state of the disk-transferring device is described in detail.

Figure 6A:
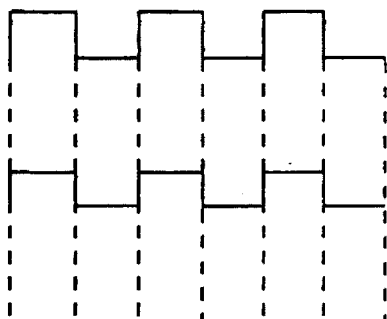
Figure 6B:
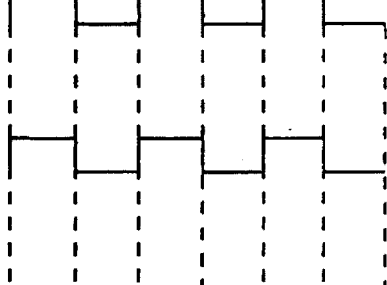

If the left frame 15 is exactly coincident with the right frame 16 in the horizontal state, the pulse detected by the left sensor 34 is shown in FIG. 6A and the pulse detected by the right sensor 28 is shown in FIG. 6B.

The pulse output from the left sensor 34 and the pulse output from the right sensor 28 are respectively applied to the location comparator 35 and are compared with one another. Since these two pulses are identical with each other, the location comparator 35 produces a low level pulse as shown in FIG. 6C.

Figure 6D:
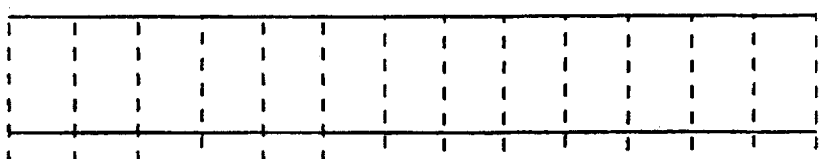

The low-level pulse output from the location comparator 35 is simultaneously applied to the pulse width converter 36 and to the microcomputer 40. Since the applied pulse is at a low level, the output of the pulse width converter 36, having an expanded pulse width, also retains the low level, as shown in FIG. 6D.

Figure 6E:
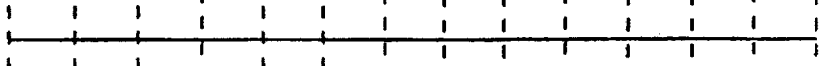

The microcomputer 40 cannot determine the rotation direction of the correction motor 29, since the applied pulse is at a low level. The low-level pulse output from the pulse width converter 36 is applied to the integrator 37 to be integrated. Even through this low-level pulse passes through the integrating step as shown in FIG. 6E, it also retains a low level. The integrated pulse is then applied to the pulse comparator 39.

Figure 6F:
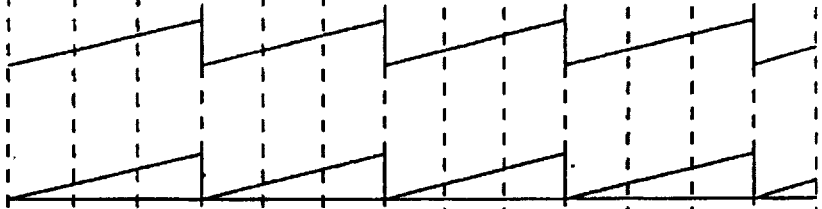
Figure 6G:
Figure 6H:
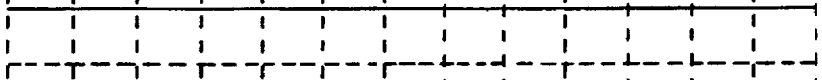

In addition, the reference voltage generator 38 generates the reference voltage pulse as shown in FIG. 6F and then outputs it to the pulse comparator 39. The pulse comparator 39 is provided simultaneously with the integrated pulse (shown in FIG. 6E) from the integrator 37 and the reference voltage pulse (shown in FIG. 6F) from the reference voltage generator 38, as shown in FIG. 6G, and compares them with each other to output its result, shown in FIG. 6H, to motor driver 41.

Figure 6I:

The motor driver 41 produces a high-level pulse in the case in which the reference voltage pulse is larger than the integrated pulse as mentioned above, and produces a low-level pulse in the case where the reference voltage pulse is smaller than the integrated pulse. According to the result compared in the pulse comparator 39, the reference voltage pulse always has a value larger than that of the integrated pulse, and motor driver 41 outputs a high-level pulse as shown in FIG. 6I.

Figure 6J:
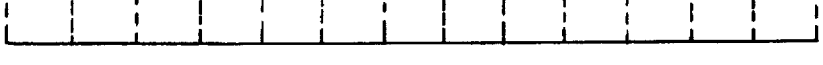

The pulse produced from motor driver 41 is applied to the modulator 42 and its phase is then reversed. In other words, the high-level pulse is converted to a low-level pulse to be output to the correction motor 29 as shown in FIG. 6J. Since the driving pulse of the correction motor 29 produced from the modulator 42 has a low level, the correction motor 29 is not operated.

Next, if the left frame 15 is inclined upward, higher than the right frame 16, the pulse shown in FIG. 7A is detected by the left sensor 34, and the pulse shown in FIG. 7B is detected by the right sensor 28.

Since the pulse produced from the left sensor 34 and the pulse produced from the right sensor 28 are respectively applied to the location comparator 35, and the pulse produced from the left sensor 34 is different from the pulse produced from the right sensor 28, the location comparator 35 produces a low-level pulse during the time when the two pulses are identical with each other, and produces a high-level pulse during the time when the two pulses are different from each other.

The pulse produced from the location comparator 35, shown in FIG. 7C, is applied to the pulse width converter 36 and to the microcomputer 40. Then, the width of the applied pulse is converted by the pulse width converter 36 to be output (e.g., assuming that the pulse width shown in FIG. 7D is three times as large as the initial pulse width shown in FIG. 7C), and the microcomputer 40 compares the applied pulse, as shown in FIG. 9A, and recognizes the level of the pulse to be low if the pulse detected via the right sensor 34 is delayed more than the pulse detected via the left sensor 28, thereby determining the rotation direction of the correction motor 29 to be in a clockwise or a counter-clockwise direction.

The pulse produced from the pulse width converter 36, as shown in FIG. 7D, is applied to the integrator 37 and integrated as shown in FIG. 7E to be applied to the pulse comparator 39. The reference voltage generator 38 produces a reference voltage pulse as shown in FIG. 7F which is applied to the pulse comparator 39.

The pulse comparator 39 compares the integrated pulse (shown in FIG. 7E) produced by the integrating circuit 37 with the reference voltage pulse (shown in FIG. 7F) produced by the reference voltage generator 38, collectively shown in FIG. 7G, and then outputs its result (i.e., the pulse shown in FIG. 7H) to motor driver 41. The motor driver 41 outputs the pulse as shown in FIG. 7I, based on the pulse applied from the pulse comparator 39. At this time, the rotation direction of the correction motor 29 determined by the microcomputer 40 is applied to motor driver 41 at the same time.

The pulse produced from motor driver 41, shown in FIG. 7I, is applied to the modulator 42 and its phase is reversed. The reversed pulse as shown in FIG. 7J is output to the correction motor 29. Just as the driving pulse, which is supplied from modulator 42, attains a high level, the correction motor 29 rotates in the direction determined by microcomputer 40.

Regarding the waveform shown in FIG. 7J, the width of the high level pulses output to correction motor 29, is gradually decreased. This is because initially the horizontal state has a large error sensed by the left and right sensors 34 and 28, where the location comparator produces a pulse having a relatively wide pulse width, as shown in FIG. 7C. The result of such an error producing a relatively large pulse width, is that a large pulse width is produced, as shown in FIG. 7J, to drive the correction motor 29 by a correspondingly large amount. By driving the correction motor 29 by a correspondingly large amount causes the horizontal error to decrease, causing the amount of correction required to decrease, resulting in smaller width pulses required to drive the correction motor 29.

Figure 8A:
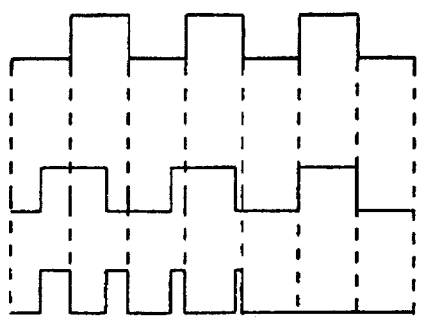

Finally, if the left frame 15 is inclined down more than the right frame 16, the pulse produced by the left sensor 34 is shown in FIG. 8A and the pulse produced by the right sensor 28 is shown in FIG. 8B.

The pulse produced by the left sensor 34 and the pulse produced from the right sensor 28 are applied to the location comparator 35 to be compared with each other. In this case the pulses are different from one another. Thus, the location comparator 35 outputs a low-level pulse during the time when the two pulses are similar in level to each other, and outputs a high-level pulse during the times when the two pulses are different in level from each other, as shown in FIG. 8C. The pulse output by the location comparator 35, shown in FIG. 8C, is applied to the pulse width converter 36 and to the microcomputer 40.

Figure 8D:

The width of the pulse applied to the pulse width converter 36 is expanded and output as shown in FIG. 8D (e.g., assuming that the pulse width shown in FIG. 8D is three times as large as the initial pulse width shown in FIG. 8C).

In addition, the microcomputer 40 compares the applied pulse as shown in FIG. 9B and perceives the level of the pulse to be high if the pulse sensed via the right sensor 28 is prior to the pulse detected via the left sensor 34, thereby determining the rotation direction of the correction motor 29 opposite to the case in which the pulse is perceived to have a low-level.

Figure 8E:
Figure 8F:

The pulse produced from the pulse width converter 36, shown in FIG. 8D, is applied to the integrator 37 and integrated, outputting an integrated pulse as shown in FIG. 8E, which is applied to the pulse comparator 39. The reference voltage generator 38 generates the reference voltage pulse as shown in FIG. 8F, and then applies it to the pulse comparator 39.

Figure 8H:
Figure 8I:

The pulse comparator 39 compares the integrated pulse produced from the integrating circuit 37 with the reference voltage pulse produced from the reference voltage generator 38 (both pulses input to pulse comparator 39 are shown superimposed in FIG. 8H), and then outputs its result (i.e., the pulse shown in FIG. 8H) to motor driver 41. The motor driver 41 outputs the pulse as shown in FIG. 8I, based on the pulse applied from the pulse comparator 39. At the same time, the rotation direction of the correction motor 29, determined by the microcomputer 40, is applied to motor driver 41.

The pulse produced from motor driver 41, shown in FIG. 8I, is applied to the modulator 42 and the phase of the pulse is reversed. The reversed pulse, as shown in FIG. 8I, is output to the correction motor 29. Just when the driving pulse output from the modulator 42 attains a high level, the 29 rotates in a direction determined by the correction motor microcomputer 40.

Figure 8J:

Regarding the waveform shown in FIG. 8J, the width of the high level pulses output to correction motor 29, is gradually decreased. This is because initially the horizontal state has a large error sensed by the left and right sensors 34 and 28, where the location comparator produces a pulse having a relatively wide pulse width, as shown in FIG. 8C. The result of such an error producing a relatively large pulse width, is that a large pulse width is produced, as shown in FIG. 8J. to drive the correction motor 29 by a correspondingly large amount. By driving the correction motor 29 by a correspondingly large amount causes the horizontal error to decrease, causing the amount of correction required to decrease, resulting in smaller width pulses required to drive the correction motor 29.

The present invention may carry out the above-mentioned steps on the basis of the pulse detected by the right sensor 28, by mounting the correction motor 29 on the right side of the lower frame 14. The correction motor 29 of this invention can be mounted on either of the left side or the right side over the lower frame 14 to correct the error in the horizontal state.

Further, two pairs of the correction motors can be mounted respectively on the left and right sides over or under the lower frame 14 to correct the error in the horizontal state.

Each motor of the pairs of correction motors mounted on the left and right sides may have a fixed rotating direction so as to move the left and right frames 15 and 16 in one direction (i.e., up and down). The microcomputer 40 can determine which motor is to be driven among the pair of the correction motors.

Two pairs of the correction motors having rotating directions that are not fixed can be mounted respectively on the left and right sides above or under the lower frame 14, and may have a rotating direction determined by the microcomputer 40.

The correction motors should rotate in a direction opposite to each other. That is to say, if the correction motor of the left side rotates so as to move the left frame 15 downwards, the correction motor of the right side should rotate to the right frame 16 upwards. In this case, the horizontal state of the disk transferring device can be corrected without delay.

According to the horizontal state correction circuit of the disk transferring device and the method therefor, since the horizontal state may be detected and determined to correct an error in the horizontal state automatically, the disk transferring device maintains an exact horizontal state for mounting and removing a disk.

In addition, if the correction motors are mounted in pairs on both sides of the lower frame, the horizontal state of the disk transferring device can be corrected without delay.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. An apparatus for correcting a horizontal state of a disk transferring device, wherein the disk transferring device has left and right side frames, comprising:

a correction motor for correcting the horizontal state of the disk transferring device; and a circuit for detecting an error in the horizontal state of the disk transferring device corresponding to a difference in height between the left and right side frames and driving said correction motor to correct said error in the horizontal state of the disk transferring device by vertically moving at least one of the left and right side frames based on the detected error.

2. The apparatus as set forth in claim 1, wherein the disk transferring device comprises:

a lower frame having left and right ends and extending in a horizontal direction;

a left side frame and a right side frame attached to the left and right ends of said lower frame;

a chuck transferring body movably disposed on said lower frame, wherein said chuck transferring body moves horizontally between the left and right side frames;

chucks attached to said chuck transferring body, wherein said chucks clamp a selected disk from a cartridge;

a left belt fixedly attached to said left side frame;

a right belt fixedly attached to said right side frame;

a left chassis frame and a right chassis frame each extending in a vertical direction and disposed proximately to said left and right side frames, respectively, and connected to said left and right belts, respectively, whereby said belts cause said left and right side frames to move in the vertical direction.

3. The apparatus as set forth in claim 2, wherein said circuit for detecting the horizontal state of the disk transferring device comprises:

a detecting unit for detecting a height of the right side frame and the left side frame of the disk transferring device;

a comparing circuit for comparing the detected height of the right and left side frames of the disk transferring device and determining an amount of error in the horizontal state of the disk transferring device based on said comparison;

a controlling circuit for determining a rotation direction of a correction motor according to the error in the horizontal state determined by said comparison circuit; and a correcting circuit for driving said correction motor in the determined rotation direction by an amount based on the error determined by said comparator to correct the horizontal state of the disk transferring device.

4. The apparatus as set forth in claim 3, wherein said left chassis frame has a plurality of grooves formed therein which have an equally spaced vertical interval between adjacent grooves, for determining the horizontal state of the disk transferring device and said right chassis frame has a plurality of grooves having a same interval of spacing between adjacent grooves and position as the grooves of said left chassis frame for determining the horizontal state of the disk transferring device; wherein said detecting circuit comprises:

a first sensor disposed adjacent to said left chassis frame and mounted at a predetermined position on the left side frame for determining a condition of said grooves of said left chassis frame; and a second sensor disposed adjacent to said right chassis frame and mounted at a position on the right side frame equivalent to the predetermined position of said first sensor on said left side frame, for determining a condition of said grooves of said right chassis frame.

5. The apparatus as set forth in claim 3, wherein said comparing circuit comprises:

a location comparator simultaneously applied with a pulse indicating the state of said grooves of said left chassis frame detected by said first sensor together with a pulse indicating the state of said grooves of said right chassis frame detected by said second sensor, for comparing a position of said first sensor relative to said left chassis frame with a position of said second sensor relative to said right chassis frame and generating a pulse based on the comparison;

a pulse width converter for enlarging a width of the pulse generated by said location comparator;

an integrator for integrating the pulse enlarged by said pulse width converter;

a reference voltage generator for generating a reference voltage pulse; and a pulse comparator for comparing the pulse integrated by said integrator with the reference voltage pulse generated by said reference voltage generator and detecting a difference between the pulse integrated by said integrator and the reference voltage pulse.

6. The circuit as set forth in claim 3, wherein said controlling apparatus comprises a microcomputer for determining a rotation direction of said correction motor according to the pulse generated by the location comparator of the comparing circuit.

7. The apparatus as set forth in claim 3, wherein said correcting circuit comprises:

a motor driver for determining an amount of rotation of the correction motor according to a difference between the integrated pulse and the reference voltage pulse detected by the pulse comparator of the comparing circuit, and outputting a pulse based on the determined amount of rotation; and a modulator for reversing a phase of the pulse output from said motor driver and outputting the reversed pulse to said correction motor.

8. The apparatus as set forth in claim 1, further comprising a motor for moving said disk transferring device in a vertical direction a greater distance than does said correction motor, wherein said motor is different from said correction motor.

9. A method for correcting a horizontal state of a disk transferring device, wherein the disk transferring device is disposed between a left chassis frame extending in a vertical direction and a right chassis frame extending in the vertical direction, the left and right chassis frames each having recessed portions and raised portions constituting grooves, wherein the disk transferring device moves in the vertical direction and a horizontal state of the disk transferring device is corrected by one or more correction motors, the method comprising the steps of:

outputting a light signal to the grooves of the left and right chassis frames which respectively reflect a pulse according to the light signal which is reflected by the recessed portions and raised portions of the grooves;

comparing a difference between the pulses reflected from each of said left and right chassis frames and detecting a portion of said pulses having a level different from one another;

integrating the detected different portions of said pulses to generate an integrated pulse;

determining a rotation direction of the one or more correction motors while simultaneously performing said integrating step;

comparing the integrated pulse with a reference voltage pulse;

determining an amount of rotation of said correction motors based on the compared value; and driving said correction motors to rotate according to the determined rotation direction and by the amount determined in the step of determining an amount of rotation, thereby correcting the horizontal state of the disk transferring device to be substantially perpendicular to the vertical direction.

10. The method as set forth in claim 9, wherein said rotation direction of said correction motors is fixed to a single direction if there are a plurality of said correction motors.

11. The method as set forth in claim 9, wherein in said step of determining the rotation direction of the one or more correction motors the rotation direction of a first of the correction motors is opposite to the rotation direction of a second of the correction motors.

12. An apparatus for correcting a horizontal state of a disk transferring device having a lower frame extending in a horizontal direction between two ends and having left and right frames disposed on the two ends, respectively, the left frame fixedly connected to a first belt which is connected to a left chassis frame extending in a vertical direction between a top end and a bottom end thereof, and the right frame fixedly connected to a second belt which is connected to a right chassis frame extending in the vertical direction between a top end and a bottom end thereof, wherein the disk transferring device moves in the vertical direction such that the lower frame is substantially perpendicular to the left and right chassis frames, the apparatus comprising:

a correcting motor;

a detecting circuit for detecting a height of the left and right frames of the disk transferring device;

a comparing circuit for comparing the detected height of the left and right frames of the disk transferring device and determining an amount of error in the horizontal state of the disk transferring device based on the comparison;

a controlling circuit for determining a rotation direction of said correction motor according to the error in the horizontal state determined by said comparing circuit; and a correcting circuit for driving said correction motor in the determined rotation direction by as much as the amount of error determined by said comparing circuit to correct the error in the horizontal state of the disk transferring device.

13. The circuit as set forth in claim 12, wherein the disk transferring device includes a chuck transferring body disposed on the lower frame and chucks disposed on the chuck transferring body, wherein the chuck transferring body transfers the chucks in the horizontal direction along the lower frame and the chucks clamp a selected disk from a cartridge.

14. The apparatus as set forth in claim 12, further comprising a motor connected to one of the first and second belts for moving said disk transferring device in the vertical direction a greater distance than does said correction motor, wherein said motor is different from said correction motor.

15. The apparatus as set forth in claim 12, wherein the left chassis frame has a plurality of grooves having an equally spaced vertical interval between adjacent grooves, to determine the horizontal state of the disk transferring device and the right chassis frame has a plurality of grooves having a same interval of spacing between adjacent grooves and position as the grooves of the left chassis frame to determine the horizontal state of the disk transferring device, wherein said detecting circuit comprises:

a first sensor disposed adjacent to said left chassis frame and mounted at a predetermined position on the left frame to determine a condition of said grooves of said left chassis frame; and a second sensor disposed adjacent to said right chassis frame and mounted at a position on the right frame equivalent to the predetermined position of said first sensor on the left frame, to determine a condition of said grooves of said right chassis frame, wherein said comparing circuit comprises:

a location comparator simultaneously applied with a pulse indicating the state of said grooves of said left chassis frame detected by said first sensor together with a pulse indicating the state of said grooves of said right chassis frame detected by said second sensor, for comparing a position of said first sensor relative to said left chassis frame with a position of said second sensor relative to said right chassis frame and generating a pulse based on the comparison;

an integrator for integrating the pulse generated by said location comparator;

a reference voltage generator for generating a reference voltage; and a pulse comparator for comparing the pulse integrated by said integrator with the reference voltage pulse generated by said reference voltage generator and detecting a difference between the integrated pulse and the reference voltage pulse.

16. The apparatus as set forth in claim 15, wherein said comparing circuit further comprises:

a pulse width converter for enlarging a width of the pulse generated by said location comparator, wherein said integrator integrates the pulse enlarged by said pulse width converter.

17. The apparatus as set forth in claim 16, wherein said controlling circuit comprises a microcomputer for determining a rotation direction of said correction motor according to the pulse generated by said location comparator of said comparing circuit.

18. The apparatus as set forth in claim 16, wherein said correcting circuit comprises:

a motor driver for determining an amount of rotation of the correction motor according to a difference between the integrated pulse and the reference voltage pulse detected by the pulse comparator of the comparing circuit, and outputting a pulse based on the determined amount of rotation; and a modulator for reversing a phase of the pulse output from said motor driver and outputting the reversed pulse to said correction motor.

19. The apparatus as set forth in claim 12, wherein said correction motor is mounted on either a left or a right side of the lower frame to correct an error in the horizontal state of said disk transferring device.

20. The apparatus as set forth in claim 12, wherein said correction motor is mounted either above or below said lower frame.

21. The apparatus as set forth in claim 12, wherein said correction motor is mounted on the left side and another correction motor is mounted on the right side of said disk transferring device, each of the correction motors being mounted either above or below said lower frame.

22. The apparatus as set forth in claim 21, wherein said correction motor rotates to move said lower frame vertically.

23. The apparatus as set forth in claim 21, wherein said correction motor rotates in two directions to move said left frame vertically, and the other correction motor rotates in two directions and in a direction opposite to said correction motor to move said right frame vertically.

24. A method for correcting a horizontal state of a disk transferring device, wherein the disk transferring device is disposed between a left chassis frame extending in a vertical direction and a right chassis frame extending in the vertical direction, the left and right chassis frames each having recessed portions and raised portions constituting grooves, wherein the disk transferring device moves in the vertical direction and the horizontal state of the disk transferring device is corrected by a plurality of correction motors, the method comprising the steps of:

outputting a light signal to the grooves of the left and right chassis frames which respectively reflect a pulse according to the light signal which is reflected by the recessed portions and raised portions of the grooves;

comparing a difference between the pulses reflected from each of said left and right chassis frames and detecting a portion of said pulses having a level different from one another;

integrating the detected different portions of said pulses to generate an integrated pulse;

determining which of the plurality of correction motors to drive while simultaneously performing said integrating step;

comparing the integrated pulse with a reference voltage pulse;

determining an amount of rotation of said correction motors based on the compared value; and driving said correction motors to rotate according to the determined rotation direction and by the amount determined in the step of determining an amount of rotation, thereby correcting a horizontal state of the disk transferring device to be substantially perpendicular to the vertical direction.

* * * * *